INVENTOR
FERDINAND MONTEMARANI
BY
ATTORNEY

Patented Sept. 9, 1952

2,609,700

UNITED STATES PATENT OFFICE 2,609,700

VARIABLE SPEED MECHANISM

Ferdinand Montemarani, Fort Erie,
Ontario, Canada

Application July 15, 1950, Serial No. 174,002

2 Claims. (Cl. 74—230.17)

This invention relates to improvements in variable speed mechanisms of the belt-driven type.

One of the objects of the invention is to provide a variable speed mechanism of the type mentioned, in which a pair of pulleys operates in conjunction with a belt, each of the pulleys being adjustable relative to the other.

A second object is to provide a variable speed mechanism of the type described which is readily adjustable by means of a lever affixed on the exterior of the casing in which the device is enclosed, the said lever operating by a single movement to vary the effective diameter of the pulleys in inverse ratio to each other thus permitting an infinite variation of speed within defined upper and lower limits without the necessity of adjusting either of the pulleys individually.

A further object is to provide a mechanism of the type described which is quite simple and economical in its parts and which is very compact and mobile.

Other objects of the invention will appear from the description and claims.

Referring now to the drawings forming part of this specification:

Similar reference numerals refer to similar parts throughout the various views.

Figure 1:
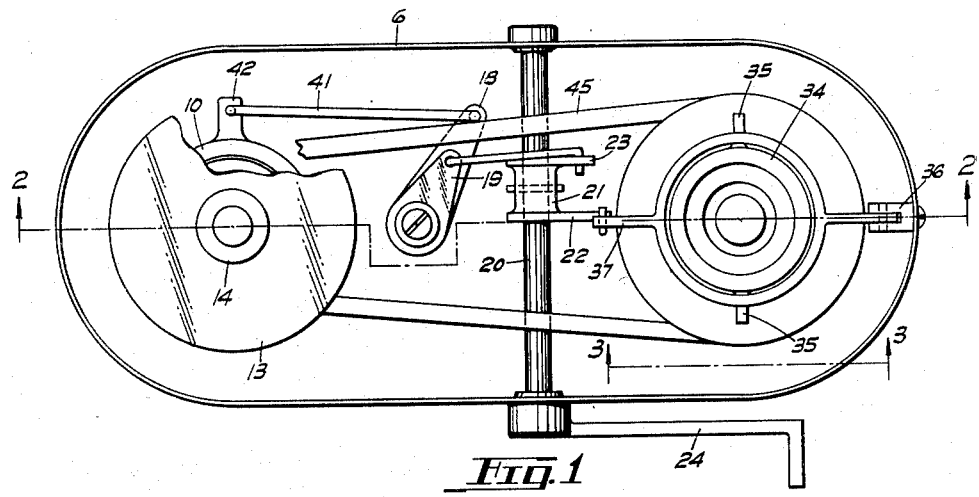
Figure 1 is a plan view showing the variable speed mechanism, omitting the container cover.
Figure 2:
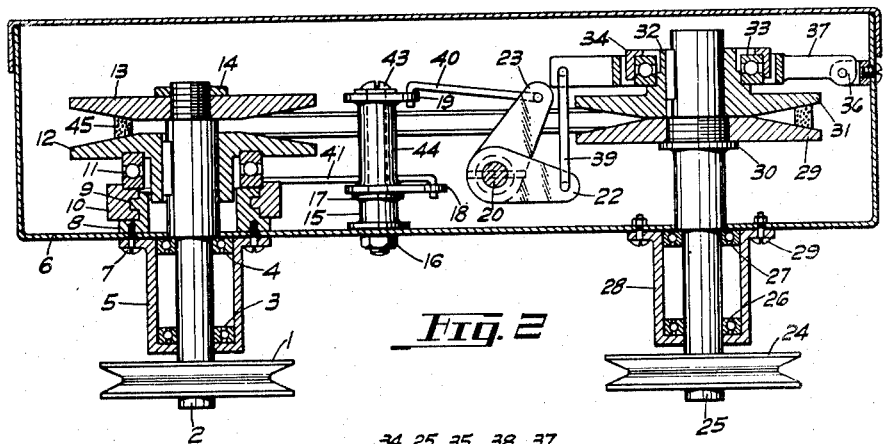
Figure 2 is a cross section taken on line 2—2 of Figure 1.
Figure 3:
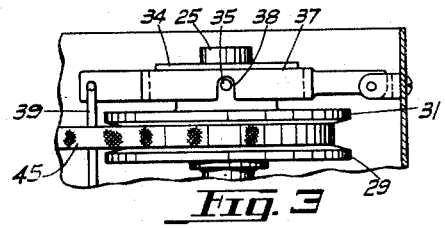
Figure 3 is a part section taken on line 3—3 of Figure 1.

In the embodiment of my invention illustrated, 1 is a drive pulley keyed or otherwise secured to shaft 2 which is enabled to rotate freely by reason of ball bearings 3 and 4, the inner races of which are fitted tightly to the shaft, and the outer races being held within housing 5. The housing 5 is located on the unit container 6 by screws 7 which pass through it and into a cylinder 8 which has multiple threads 9 cut on its outer surface to engage a nut 10. The nut 10 may turn about the fixed threaded cylinder 8, and thus a vertical movement is imparted to nut 8. Nut 10 is bored slightly on its upper surface to receive and nest the lower race of ball bearing 11 in such manner that any vertical movement of nut 10 is communicated through the bearing 11 to the lower flange 12 of the split V pulley of which 13 is the upper flange. The upper portion of shaft 2 is enlarged in diameter and is fitted with a key, so that the lower flange 12 of the pulley being provided with a keyway can slide freely on the shaft but must rotate with the shaft. The upper flange 13 of V pulley is screwed down tightly on to a shoulder on shaft 2 and locked thereon by locknut 14. A post 15 is secured to the base plate of container 6 by means of nut 16. Resting upon a flange 17 of post 15 and free to turn thereon is a cylindrical standard 44 which embodies two lever arms 18 and 19 respectively. This standard is restrained from vertical motion by reason of a retaining washer and screw 43. A control shaft 20 with suitable bearings in the side of container 6 supports a bracket 21 which is located and held in position by means of a taper pin or other suitable means. The bracket 21 is provided with two lever arms 22 and 23 respectively. Shaft 20 is provided with a hand lever 24 or similar means to easily and readily turn shaft 20. A pulley 24 is keyed or otherwise secured to shaft 25 which rotates within ball bearings 26 and 27, the inner races of which are fitted tightly to the shaft and the outer races being held within housing 28. The housing 28 is located and held securely to the unit container 6 by screws 29. The upper portion of shaft 25 is enlarged in diameter and provided with a shoulder 30 which supports the lower flange 29 of a split V pulley, this flange being screwed down tightly to the shoulder.

The upper flange 31 of the V pulley is provided with a keyway which allows vertical movement in relation to the shaft, but by reason of key 32 must rotate with the shaft. The upper portion of pulley flange 31 is cut to provide a seating for the lower race of ball bearing 33, the upper race being fitted within retainer 34 which has projecting pins 35.

Pivoted at 36 is yoke ring lever 37 which has recesses 38 cut in it to receive pins 35. The yoke ring lever 37 is connected by rod 39 to the lower arm of lever bracket 22, and the upper arm of lever bracket 23 is connected by rod 40 to the upper lever arm 19 of the cylindrical standard 44 whilst the lower arm 18 of the cylindrical standard is connected by rod 41 to lug 42 which is an integral part of nut 10.

The method of operating my improved device may be described as follows: Assume that pulley 1 is a driver which produces a given speed at the driven pulley 24. It will be apparent that if the lever 20 be turned in an anti-clockwise direction the lever bracket 21, which is pinned to shaft 20, will produce a thrust in rod 40, so causing lever standard 44 to turn about its centre so producing a thrust in rod 41, which being connected to the threaded nut 10 through its lug 42, will cause an upward motion of the nut due to the threads, thereby raising the lower pulley flange 12. The resulting closing together of the pulley flanges will of necessity cause the pulley belt 45 to move outward and thereby virtually produce a larger effective diameter of pulley. At the same time the yoke 37 will have been raised by the upward thrust of rod 39 allowing pulley belt 45 to raise the upper pulley portion 31 which by so doing produces a smaller effective diameter of pulley. By this procedure therefore an infinite number of combination of pulley diameters may be obtained, resulting in a great variety of speeds, out of which any desired speed may be obtained by setting the hand lever or other substituting control mechanism to suit the condition desired.

It will be understood that I have described and shown the preferred forms of my invention, and that I may make such changes and alterations in the general arrangement and in the construction of minor details thereof as come within the scope of the appended claims without departing from the spirit of my invention and the principles involved.

What I claim as my invention is:

1. A variable speed mechanism comprising in combination a casing, driving and driven shafts, a pair of coacting V-pulleys each split to form a pair of coacting discs, one of the said pulleys being mounted within the casing on the driving shaft and rotatable therewith and having one of its discs fixedly secured on the end of the said driving shaft, the coacting disc of said pulley being splined to the said driving shaft for axial movement thereon, a threaded cylinder disposed around the said driving shaft, a nut threaded on the cylinder and adapted to operate upon the outer face of the pulley disc splined to the driving shaft, the other of said pulleys being mounted within the casing on the driven shaft and rotatable therewith and having one of its discs positioned at the end of said driven shaft and splined thereto for axial movement thereon, the coacting disc of said pulley being fixedly mounted on the said driven shaft, a V-belt coacting with said pulleys, a crank bracket comprising two levers, said bracket being pivotally mounted with one of its lever ends operatively associated with the axially movable disc of the pulley mounted on the driven shaft and operating when turned in one direction to urge said disc toward the disc fixedly secured on said driven shaft, manually controlled means for selectively actuating the said crank bracket, a second crank bracket pivotally mounted and actuated by the second lever of the first crank bracket, said second crank bracket having a lever end operatively associated with the nut threaded on the cylinder on the driving shaft and operating to urge the axially movable disc of the pulley mounted on the driving shaft toward the disc fixedly secured on said driving shaft, the V-belt coacting with said pulleys to impart to one pair of pulley discs a like inverse variation in diameter to that positively imparted to the other pair of pulley discs.

2. A variable speed mechanism comprising in combination a casing, driving and driven shafts, a pair of coacting V-pulleys each split to form a pair of coacting discs, one of the said pulleys being mounted within the casing on the driving shaft and rotatable therewith and having one of its discs fixedly secured on the end of said shaft, the coacting disc of said pulley being splined to the said driving shaft for axial movement thereon, a threaded cylinder disposed around the said driving shaft, a nut threaded on the cylinder and adapted to operate upon the outer face of the pulley disc splined to the driving shaft, the other of said pulleys being mounted within the casing on the driven shaft and rotatable therewith and having one of its discs positioned at the end of said driven shaft and splined thereto for axial movement thereon, the coacting disc of said other pulley being vertically mounted on the said driven shaft, a V-belt coacting with said pulleys, means for simultaneously varying the effective diameter of each of the pulleys in inverse ratio to each other, said means consisting of a control shaft having a hand lever mounted thereon exteriorly of the casing, a crank lever comprising two arms, said crank lever carried by said control shaft, a rod connecting one arm of said crank lever to a yoke fulcrumed on the interior of the casing and adapted to retain the axially movable disc of the pulley on the driven shaft against movement away from the coacting disc fixedly mounted on the said driven shaft, a rod connecting the other arm of said crank lever to a second crank lever and a rod connecting said second crank lever to the nut threaded on the cylinder disposed around the driving shaft.

FERDINAND MONTEMARANI.

REFERENCES CITED

The following references are of record in the file of this patent:

UNITED STATES PATENTS

| Number | Name | Date |
|---|---|---|
| 692,120 | Conner | Jan. 28, 1902 |
| 2,221,166 | Heinrich | Nov. 12, 1940 |
| 2,259,567 | Johnson | Oct. 21, 1941 |
| 2,278,739 | Reeves | Apr. 7, 1942 |
| 2,321,494 | Krag | June 8, 1942 |

FOREIGN PATENTS

| Number | Country | Date |
|---|---|---|
| 162,378 | Great Britain | Apr. 27, 1921 |